(12) United States Patent
Camilleri et al.

(10) Patent No.: US 11,623,387 B2
(45) Date of Patent: Apr. 11, 2023

(54) METHOD OF SPRAY FORMING AN OBJECT

(71) Applicant: EFFUSIONTECH IP PTY. LTD., Dandenong (AU)

(72) Inventors: Steven Camilleri, Bayview (AU); Andrew Duguid, Dandenong (AU)

( * ) Notice: Subject to any disclaimer, the term of this patent is extended or adjusted under 35 U.S.C. 154(b) by 222 days.

(21) Appl. No.: 17/292,181

(22) PCT Filed: Oct. 22, 2019

(86) PCT No.: PCT/AU2019/051148
§ 371 (c)(1),
(2) Date: May 7, 2021

(87) PCT Pub. No.: WO2020/093085
PCT Pub. Date: May 14, 2020

(65) Prior Publication Data
US 2021/0370587 A1    Dec. 2, 2021

(30) Foreign Application Priority Data

Nov. 9, 2018   (AU) ................................ 2018904269

(51) Int. Cl.
| | | |
|---|---|---|
| *B29C 64/153* | (2017.01) | |
| *B22F 10/20* | (2021.01) | |
| *C23C 24/04* | (2006.01) | |
| *C23C 30/00* | (2006.01) | |
| *B33Y 10/00* | (2015.01) | |
| *B33Y 30/00* | (2015.01) | |
| *B33Y 70/00* | (2020.01) | |

(52) U.S. Cl.
CPC ............ *B29C 64/153* (2017.08); *B22F 10/20* (2021.01); *C23C 24/04* (2013.01); *C23C 30/00* (2013.01); *B33Y 10/00* (2014.12); *B33Y 30/00* (2014.12); *B33Y 70/00* (2014.12)

(58) Field of Classification Search
CPC ....... B29C 64/153; B33Y 10/00; B33Y 30/00; B33Y 70/00; B33Y 40/20; B22F 10/64; B22F 10/25; B22F 12/00; B22F 3/115; B22F 12/20
See application file for complete search history.

(56) References Cited

U.S. PATENT DOCUMENTS

| | | | |
|---|---|---|---|
| 8,283,048 B2* | 10/2012 | Taylor | ........................ C23C 4/11 |
| | | | 428/433 |
| 8,591,986 B1 | 11/2013 | Ajdelsztajn et al. | |
| 2007/0098913 A1 | 5/2007 | Raybould et al. | |
| 2008/0131612 A1* | 6/2008 | Hu | ........................... C23C 24/04 |
| | | | 427/454 |
| 2016/0230288 A1* | 8/2016 | Amini | ...................... C23C 24/04 |

FOREIGN PATENT DOCUMENTS

| | | |
|---|---|---|
| WO | 2015036802 A2 | 3/2015 |
| WO | 2017003427 A1 | 1/2017 |

* cited by examiner

*Primary Examiner* — Nahida Sultana
(74) *Attorney, Agent, or Firm* — Welsh Flaxman & Gitler LLC

(57) ABSTRACT

The invention relates to a method of forming a 3-dimensional solid object, comprising the steps:
a) cold spraying one or more metallic powder to form a solid three dimensional item;
b) thermally sintering the item such that a portion of the sprayed powder liquefies and reduces spaces between, and/or non-adhesion of, one or more solid portions of the item; and
c) causing or allowing the portion of the sprayed powder that liquefied on heating, to become solid.

20 Claims, 2 Drawing Sheets

METHOD OF SPRAY FORMING AN OBJECT

RELATED APPLICATIONS

This application is a national stage filing under 35 U.S.C. 371 of International Application No.: PCT/AU2019/051148, filed Oct. 22, 2019, which claims priority to AU 2018904269, filed Nov. 9, 2018, the entire teachings of which are incorporated herein by reference.

FIELD OF INVENTION

This invention relates to a method of spray forming an object, for example by way of cold sprayed powder.

BACKGROUND

Cold spraying metallic powders for forming 3D products is known. The process may be regarded as a type of 3D printing. The powders are typically entrained in an accelerant gas and sprayed through the nozzle of a hand help gun or a robotic device to create or repair products or parts thereof.

A problem with at least many cold spray processes is that imperfect bonding of the deposited metallic particles results in the finished product having inadequate strength. It is believed that this can be attributed to metallurgical discontinuity between the bonded sections of sprayed particles. For example excessive gaps or unfilled voids may be left between deposited particles. Further, excessive portions of the surface of particles may fail to bond with neighboring particles. To address these problems the powders may be sprayed more aggressively, for example by increasing the speed, temperature or by compression of the sprayed powder via a hot isostatic press. While these measures may ameliorate defects, they can also increase manufacturing costs to an unacceptable level.

Another problem is that alloys with favourable mechanical hardness can be very difficult to deposit with cold spray, with low retention of powders (ie low deposition efficiencies) because the powders themselves are very hard. This problem can sometimes be rectified by annealing the powders, but this is time consuming and expensive.

It is also known to use metallurgical techniques for forming objects from metallic powders. These involve compacting metallic powders before or while heating them. The combination of compaction and heat acts to bond the powders in a closed or open die, or compacted first and heated afterwards, to create a solid metallic object. In some cases, the powders are first lightly compacted in a closed die and then heated and struck forcefully with a second die (this is known as powder forging). However such dies can be undesirably expensive and time-consuming to produce.

OBJECT OF THE INVENTION

It is an object of a preferred embodiment of the invention to go at least some way towards addressing the above problems. While this object applies to the preferred embodiment, it should not be seen as a limitation on the scope of claims expressed more broadly. In this regard the object of the invention per se is simply to provide the public with a useful choice.

DEFINITIONS

The term "comprising" if and when used in this document in relation to a combination of steps or features should not be taken to rule out the option of there being other, non-specified, steps or features. The term should therefore be interpreted non-exclusively.

The term "cold spraying" as used in this document refers to spraying powder through a nozzle at temperatures below the powder melting point and at speeds high enough to create bonding when the powder impacts a target.

SUMMARY OF INVENTION

According to one aspect of the invention there is provided a method of forming a 3-dimensional solid object, comprising the steps:
  a) cold spraying one or more metallic powder to form a solid three dimensional item;
  b) thermally sintering the item such that a portion of the sprayed powder liquefies and reduces spaces between, and/or non-adhesion of, one or more solid portions of the item; and
  c) causing or allowing the portion of the sprayed powder that liquefied on heating, to become solid.

Optionally the sprayed powder comprises a blend of at least a majority powder being a main matrix forming powder and at least a minority powder being a sintering powder.

Optionally the majority powder and/or the minority powder each comprise alloy.

Optionally at step b) the item is heated to a temperature above the lowest melting temperature of an alloy formed by the matrix forming powder and the sintering powder.

Optionally at step b) the item is heated and held at one or more temperature below the lowest melting temperature of an alloy formed by the matrix powder and the sintering powder, prior to exceeding such temperature.

Optionally the shape of the item when formed is substantially determined by the matrix forming powder.

Optionally, substantially only the sintering powder that liquefies at step b).

Optionally the matrix forming powder has an additional metallic content of:
  a) less than 3% by weight;
  b) less than 2.2% by weight; or
  c) less than 1.5%, by weight.

Optionally at least most of the matrix forming powder comprises primarily one or more of aluminium, copper, nickel, iron and/or a 6000 series aluminium alloy.

Optionally the matrix forming powder comprises a ceramic substance.

Optionally the sintering at step b) is by a sintering powder comprising a majority of one or more of aluminium, copper, nickel, tin and zinc.

Optionally the sintering at step b) is by a sintering powder that is:
  a) less than 15% by weight of the sprayed powder;
  b) less than 10% by weight of the sprayed powder; or
  c) Less than 5% by weight of the sprayed powder.

Optionally the combination of the matrix forming powder and the sintering powder has a minority of elements that provide sintering at step b), the minority comprising one or more of magnesium, silicon, carbon, nickel, copper, zinc, tin, aluminium, lithium, chrome, iron and manganese.

Aluminium, Al—Si—Mg & Copper Powder

Optionally the sprayed powder consists of or comprises Aluminium (eg in a 6000 Series Alloy), Al—Si—Mg and copper, and, at step b), the item is:
  a) held at 524-610° C., optionally for at least 1 to 7 hours; and subsequently
  b) held at to 470-550° C.; and then c) cooled such that alloying elements are in a saturated solid solution.

Optionally the sprayed powder consists of or comprises Aluminium (eg in a 6000 Series Alloy), Al—Si—Mg and copper and, at step b), the item is:
  a) held at 450-525° C., optionally for 15-300 minutes; and subsequently
  b) held at 524-610° C., optionally for least 1-7 hours; and subsequently
  c) held at to 470-550° C.; and then
  d) cooled such that alloying elements are in a saturated solid solution.

Copper & Aluminium Powder

Optionally the sprayed powder consists of or comprises copper, and aluminium (up to about 15% by weight aluminium), and, at step b), the item is held at 850-1000° C. optionally for at least 8 to 16 hours.

Optionally the sprayed powder consists of or comprises copper and aluminium (up to about 15% by weight aluminium) and, at step b), the item is:
  a) held at 325-400° C., optionally for at least 4-18 hours; and subsequently
  b) held at 850-1000° C., optionally for at least 8-16 hours.

Optionally the sprayed powder consists of or comprises copper and aluminium (optionally up to about 15% by weight aluminium) and, at step b), the item is:
  a) held at 325-400° C., optionally for at least 4-18 hours; and subsequently
  b) held at 850-1,000° C., optionally for at least 8-16 hours; and subsequently
  c) held at to 800-1000° C.; and then
  d) cooled such that alloying elements are in a saturated solid solution.

Copper, Aluminium, Iron and Nickel or Silicon Powder

Optionally the sprayed powder consists of or comprises copper and aluminium (optionally up to about 15% by weight aluminium) with up to 4% iron, and up to 3% nickel or silicon Copper & Zinc Powder Optionally the sprayed powder consists of or comprises copper and zinc (optionally up to about 15% by weight zinc) and, at step b), the item is held at 850-950° C., optionally for at least 8-14 hours.

Optionally the sprayed powder consists of or comprises copper and zinc (optionally up to about 15% by weight zinc) and, at step b), the item is:
  a) held at 320-400° C., optionally for at least 1 to 8 hours; and subsequently
  b) held at 850-950° C., optionally for at least 8 to 14 hours.

Optionally the sprayed powder consists of or comprises copper and zinc (optionally up to about 15% by weight zinc) and, at step b), the item is:
  a) held at 320-400° C., optionally for at least 1 to 8 hours; and subsequently
  b) held at 420-550° C., optionally for at least 5-25 minutes; and subsequently
  c) held at 850-950° C., optionally for at least 8 to 14 hours.

Copper & Tin Powder

Optionally the sprayed powder consists of or comprises copper and tin (optionally up to about 10% by weight tin) and, at step b), the item is held at 850-950° C., optionally for at least 8 to 14 hours.

Optionally the sprayed powder consists of or comprises copper and tin (optionally up to about 10% by weight tin) and, at step b), the item is:
  a) held at 200-230° C., optionally for at least 1-8 hours; and subsequently
  b) held at 850-950° C., optionally for at least 8 to 14 hours.

Optionally the sprayed powder consists of or comprises copper and tin (optionally up to about 10% by weight tin) and, at step b), the item is:
  a) held at 231-400° C., optionally for at least 5-25 minutes; and subsequently
  b) held at to 850-950° C., optionally for at least 8-14 hours.

Copper & Iron Powder

Optionally the sprayed powder consists of or comprises iron and copper (optionally up to about 5% by weight copper) and, at step b), the item is held at 1,096-1,200° C. optionally for at least 8-14 hours.

Optionally the sprayed powder consists of or comprises iron and copper (optionally up to about 5% by weight copper) and, at step b), the item is:
  a) held at 800-1,096° C., optionally for at least 1-8 hours; and subsequently
  b) held at 1,096-1,200° C., optionally for at least 8-14 hours.

Optionally the sprayed powder consists of or comprises iron and copper (optionally up to about 5% by weight copper) and, at step b), the item is:
  a) held at 1,096-1,200° C., optionally for at least 8-14 hours; and subsequently
  b) held at to 750-900° C., and subsequently optionally
  c) cooled to produce a matensitic structure.

Iron & Nickel Powder

Optionally the sprayed powder consists of or comprises iron and nickel (optionally up to about 5% by weight nickel) and, at step b), the item is held at 1,455-1,490° C., optionally for at least 8-14 hours.

Optionally the sprayed powder consists of or comprises iron and nickel (up to about 5% by weight nickel) and, at step b), the item is:
  a) held at 1,000-1,455° C., optionally for at least 1-8 hours; and subsequently
  b) held at 1,455-1,490° C., optionally for at least 8-14 hours.

Optionally the sprayed powder consists of or comprises iron and nickel (up to about 5% by weight nickel) and, at step b), the item is:
  a) held at 1,455-1,490° C., optionally for at least 8-14 hours; and subsequently
  b) held at to 750-900° C., and subsequently
  c) cooled to produce a matensitic structure.

Nickel & Copper Powder

Optionally the sprayed powder consists of or comprises nickel and copper (up to about 15% by weight copper) and, at step b), the item is held at 1,100-1,300° C., optionally for at least 8-14 hours.

Optionally the sprayed powder consists of or comprises nickel and copper (up to about 15% by weight copper) and, at step b), the item is:
  a) held at 900-1,100° C., optionally for at least 1-8 hours; and subsequently
  b) held at 1,100-1,300° C., optionally for at least 8-14 hours.

Any Powders

Optionally the sprayed powder at step a) consists of or comprises spheroidal particles, eg spheres or oblate spheroids.

Optionally the sprayed powder at step a) consists or comprises particles that are not irregular, spiky or rough.

Optionally the sprayed powder at step a) consists or comprises particles, at least 90% of which are 15-80 μm in span (eg in diameter).

Optionally the sprayed powder at step a) consists or comprises particles, at least 90% of which are 15-45 μm in span (eg in diameter).

Optionally the matrix forming powder has a hardness of less than 200 HV.

Optionally the matrix forming powder has a hardness of less than 150 HV.

Optionally the matrix forming powder has a hardness of less than 100 HV.

IMAGES

Some preferred embodiments of the invention will now be described by way of example and with reference to the accompanying images of which:

Figure 4:
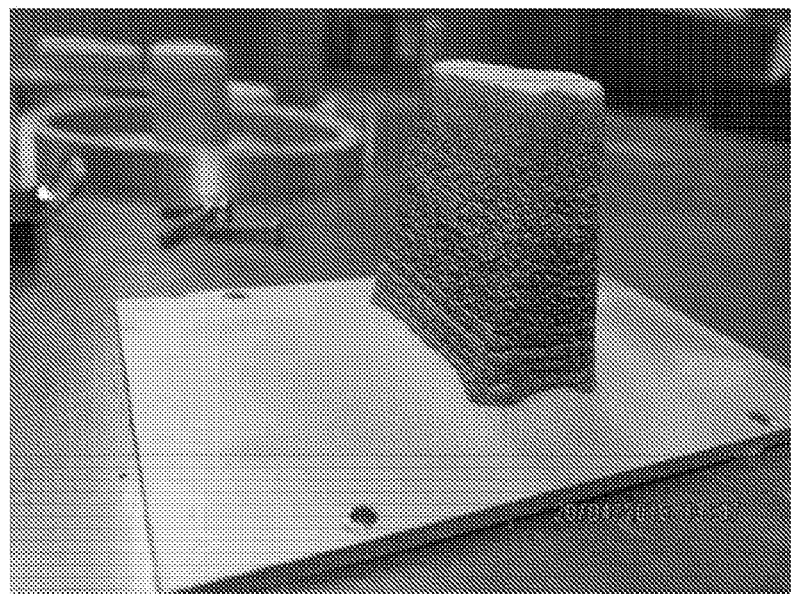

FIG. 4: illustrates, photographically, a further block prepared by cold spraying a blend Al—Si10-Mg+3% Cu.

DETAILED DESCRIPTION

Various three dimensional objects were formed by cold spraying according to the details noted below.

EXAMPLE 1

Cold Sprayed Aluminium Alloy 6061 Powder

Aluminum Alloy 6061 is a commercially available product, for example as described at https://en.wikipedia.org/wiki/6061_aluminium_alloy.

Aluminum Alloy 6061 is sometimes used as a solid "wrought" product having a density of about 2.7 g/cm$^3$, a melting pint of approximately 580° C., a modulus of elasticity of about 70-80 GPa, a Poissons ratio of about 0.33, a thermal conductivity of about 173 W/m·K and an electrical resistivity of about 3.7-4.0×10-6 Ω·cm.

Aluminum Alloy 6061 is available in Australia as a powder from Ecka Granules Germany, a subsidiary of Kymera International (https://www.kymerainternational.com/), and has a composition substantially as shown in the table below.

| Component | Amount (% wt) |
| --- | --- |
| Aluminium | Balance |
| Magnesium | 0.8-1.2 |
| Silicon | 0.4-0.8 |
| Iron | Max. 0.7 |
| Copper | 0.15-0.40 |
| Zinc | Max. 0.25 |
| Titanium | Max. 0.15 |
| Manganese | Max. 0.15 |
| Chromium | 0.04-0.35 |
| Others | 0.05 |

Cold sprayed powdered Aluminum Alloy 6061 is often substandard to the wrought version in terms of the tensile strength of the finished product. This is believed to be attributable to incomplete bonding of particles within a layer, and/or between sprayed layers, in the microstructure of a cold sprayed item.

Aluminum Alloy 6061 powder was cold sprayed using compressed air at 30 bar and 500° C. to produce a series of standard tensile test bars. These were heat treated as follows:

Anneal: 575° C.×4 hr+Air Cool

Solutionise: 530° C.×1 hr+Water Quench

Age: 200° C.×1 hr

The bars were then subjected to break and elongation testing, with average results as shown in the table below. The table also provides a comparison with wrought Aluminum Alloy 6061.

|  | Cold Sprayed Aluminum Alloy 6061 powder | Wrought Aluminum Alloy 6061 |
| --- | --- | --- |
| Break Stress, MPa | 147 | 310 |
| Elongation at Break, % | 0.33 | 8 |

As indicated in the table, it is possible to effectively cold spray items from Aluminum Alloy 6061 powder. These deposit and build effectively, but the particles involved do not bond quite as well and give the same strength as for wrought aluminum.

EXAMPLE 2

Cold Sprayed Aluminum Alloy 6061 Powder+4% Cu Powder

Copper particles were found to deposit well when cold sprayed. However pure copper appears to have no or insufficient ability for thermal hardening and so is generally believed to be of limited use for structural applications. It was an unlikely candidate for cold spraying items that need to have significant strength.

Figure 1:
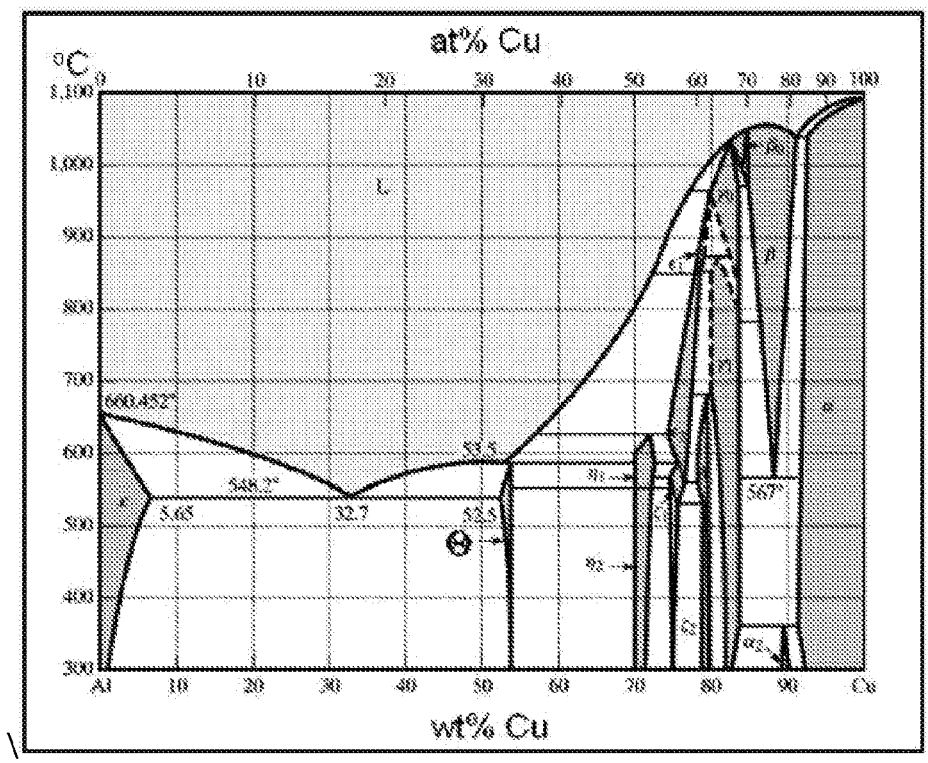
FIG. 1 is a phase diagram for copper.

However the inventors have discovered that Copper powder can be combined with Aluminum Alloy 6061 powder and cold sprayed to good effect. When sprayed in mixture with Aluminum Alloy 6061 powder, the copper powder was found to form a liquid phase above 548° C. in the resulting 3D product (as illustrated in FIG. 1). It was surprisingly discovered that that the copper gave rise to a finished item significantly harder than for Aluminum Alloy 6061 powder alone. The copper was found to have moderate diffusivity in the aluminum, making the copper able to form a ready sintering liquid phase and less likely to simply dissolve into the aluminum matrix.

A blend of Aluminum Alloy 6061 powder and 4% Cu powder, by weight, was cold sprayed using compressed air at 30 bar and 500° C. to form a series of standard tensile test bars. These were heat treated as follows:

Sintering: 610° C.×3 hr+Furnace cool

Solutionising: 505° C.×1 hr+Water Quench

Aging: 160° C.×1 hr

The resulting material was tensile tested and was found to have significant strength. This is illustrated in the table below, including a comparison to the Example 1 results.

|  | Cold Sprayed Aluminum Alloy 6061 powder with 4% Cu powder | Cold Sprayed Aluminum Alloy 6061 powder | Wrought Aluminum Alloy 6061 |
| --- | --- | --- | --- |
| Break Stress, MPa | 293 | 147 | 310 |
| Elongation at Break, % | 1.5 | 0.33 | 8 |

The Example 2 item, ie with copper in the blend, was significantly stronger than the Example 1 item, and also compared very well against the wrought item. In short, the addition of the copper powder, together with the 'after-spraying heat treatment', gave remarkably improved a breaking stress and elongation parameters.

EXAMPLE 3

Porosity of 6061+4% Cu Varies Depending on Heat Treatment

Figure 2:
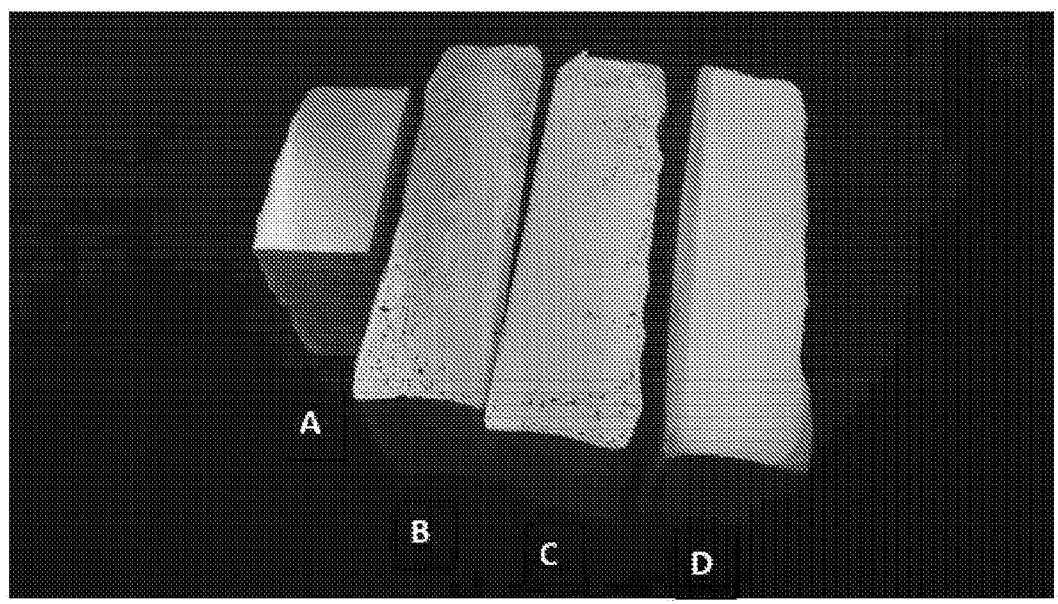
FIG. 2 illustrates, photographically, a series of blocks prepared by cold spraying a blend of Al—Si10-Mg powder+ 3% Cu powder.

Referring to FIG. 2 a series of blocks were formed by cold spraying a blend of Aluminum Alloy 6061 powder and 4% Cu powder, by weight, at 30 bar and 500° C. These were then heat treated as follows:

| Sintering Treatments for FIG. 2 | |
| --- | --- |
| Sample Number | Heat Treatment Details |
| A | No heat treatment |
| B | 555° C. × 6 hr + (FC + 530° C.) × 1 hr + WQ |
| C | 570° C. × 6 hr + (FC + 530° C.) × 1 hr + WQ |
| D | 605° C. × 1 hr + FC + 530° C. × 1 hr + WQ |

FC = Furnace Cool
WQ = Water Quench.

As shown in FIG. 2, Sample A did not show any visible porosity. However Samples B and C displayed substantial gross porosity during the heat treatment, lowering their density and making the finished item unsuitable for many mechanical applications. In surprising contrast, Sample D displayed no visible porosity, making it a candidate for mechanical applications.

EXAMPLE 4

Al—Si10-Mg+3% Cu Fails to Cold Spray

A common powdery alloy for 3D printing (eg Selective Laser Melting) is Al-10Si—Mg. A typical composition for this is illustrated below.

| Component | Amount (% wt) |
| --- | --- |
| Aluminium | Balance |
| Magnesium | 0.25-0.35 |
| Silicon | 9.5-10.5 |
| Iron | Max. 0.7 |
| Copper | 0.05 max |
| Zinc | Max. 0.25 |
| Titanium | Max. 0.15 |
| Manganese | Max. 0.15 |
| Chromium | 0.04-0.35 |
| Others | 0.05 |

Figure 3:
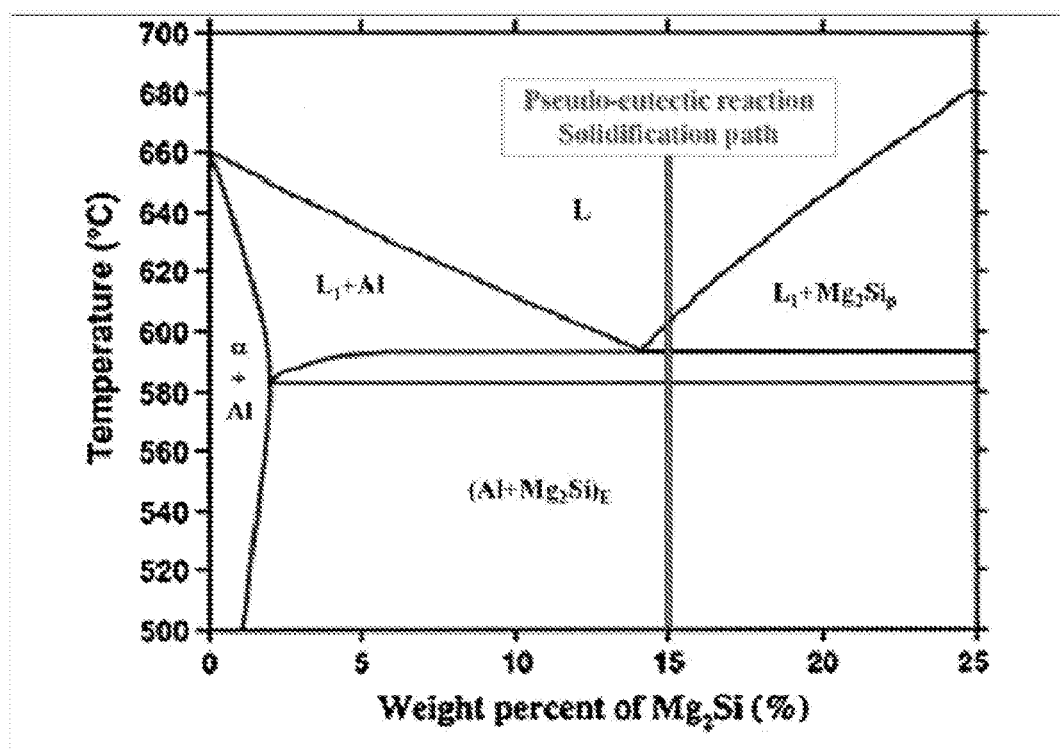
FIG. 3 is a phase diagram for Al—Si10-Mg.

Al-10Si—Mg alloy is designed to fuse and was thought to be suitable for liquid phase sintering in a cold spray context. As illustrated in FIG. 3, it has a large two-phase region (eg a large temperature zone in which it can be solid or liquid) suitable for liquid formation. Furthermore, it is able to be hardened in a similar manner to sprayed Aluminum Alloy 6061. The addition of Cu was thought to be sufficient for lowering the temperature at which sintering liquid is first present, to as little as 524° C. (Fig X). It was thought that this would promote the action of liquid phase sintering, as well as augmenting hardening response on final heat treatment as described above.

To test the above, a block of material was cold sprayed using a blend of Al—Si10-Mg powder and 3% Cu powder, by weight. The powder was applied using air at 30 bar and 500° C. However the block did not form correctly, as shown at FIG. 4. This was because the Al—Si10-Mg was found to have a low deposition efficiency in that only approximately 15% of the material sprayed was successfully incorporated into the block, the rest rebounding. This surprisingly poor result was attributed to an excessive proportion of hard silicon in the aluminum powder.

EXAMPLE 5

6061+5% Al-10Si—Mg+1% Cu with Pre-Sintering Treatment Gives Surprising Performance The 6061 alloy powder of Examples 1 and 2 was blended with 5% Al-10Si—Mg and 1% Cu, then cold sprayed. The sprayed part was then subjected to an unusual heat treatment, including a "pre-sintering" treatment, as follows:
Pre-Sintering: 500 C×20 min
Sintering: 595 C×4 hr
Solutionise: 530 C×1 hr+Water Quench
The samples were then aged 150 C×2.5 hr
This returned the remarkable result tabulated below:

| | | Previous Examples | | |
| --- | --- | --- | --- | --- |
| | Example 5 | Cold Sprayed Aluminum Alloy 6061 powder with 4% Cu powder | Cold Sprayed Aluminum Alloy 6061 powder | Wrought Aluminum Alloy 6061 |
| Break Stress, MPa | 298 | 293 | 147 | 310 |
| Elongation at Break, % | 7.5 | 1.5 | 0.33 | 8 |

EXAMPLE 6

Application of Pre-Sintering to Aluminium Bronze

Without wishing to be bound by theory, it is believed that pre-sintering treatment in Example 5 may improve the penetration of liquid along poorly-bonded interfaces, and act to reduce porosity. This effect may be generalized to various alloy systems, for example, aluminium bronze.

A pure copper powder was blended with the 10% 6061 powder of Examples 1 and 2. This was cold sprayed into parts and then heat treated in 2 ways, then tested, as per the table below. Additionally, a fully alloyed aluminium bronze powder (ie without a sintering agent) was cold sprayed and tested for comparison. The blended powder with 2 pre-sintering steps performed remarkably well.

| Composition of Powder | Heat Treatment | UTS, MPa | Elongation, % |
| --- | --- | --- | --- |
| Blend of Powders Cu + 10% 6061 | 400 C. × 5 hr, then 950 C. × 12 hr | 280 | 4.4 |
| Blend of Powders Cu + 10% 6061 | 325 C. × 16 hr, then 555 C. × 0.5 hr, then 950 C. × 16 hr | 312 | 5.3 |
| Aluminium Bronze alloy (Cu—10% Al) | 850 C. × 10 hr + WQ | 180 | 0.3 |

In terms of disclosure, this document hereby envisages and discloses each item, step or other feature mentioned herein in combination with one or more of any of the other items, steps or other features disclosed herein, in each case regardless of whether such combination is claimed.

While some preferred forms of the invention have been described by way of example it should be understood that modifications and improvements can occur without departing from the invention or the following claims.

The invention claimed is:

1. A method of forming a 3-dimensional solid object, comprising the steps:
   a) cold spraying one or more metallic powder to form a solid three dimensional item, the one or more metallic powder comprising a blend of a at least a majority powder being a main matrix forming powder and at least a minority powder being a sintering powder;
   b) thermally sintering the item such that a portion of the sprayed powder liquefies and reduces spaces between, and/or non-adhesion of, one or more solid portions of the item; wherein:
      i. the item is heated and held at one or more temperature below a lowest melting temperature of an alloy formed by the matrix powder and the sintering; and then
      ii. is heated to a temperature above said lowest melting temperature; and
   c) causing or allowing the portion of the sprayed powder that liquefied on heating, to become solid.

2. A method according to claim 1, wherein the majority powder and/or the minority powder each comprise alloy.

3. A method according to claim 1, wherein a shape of the item when formed is substantially determined by the matrix forming powder.

4. A method according to claim 1, wherein it is substantially only the sintering powder that liquefies at step b).

5. A method according to claim 1, wherein the matrix forming powder has an additional metallic content of:
   a) less than 3% by weight,
   b) less than 2.2% by weight, or
   c) less than 1.5%, by weight.

6. A method according to claim 1, wherein at least majority or larger group of the matrix forming powder comprises primarily one or more of aluminium, copper, nickel, iron and/ or a 6000 series aluminium alloy.

7. A method according to claim 1, wherein the matrix forming powder comprises a ceramic substance.

8. A method according to claim 1, wherein the sintering at step b) is by a sintering powder comprising a majority of one or more of aluminium, copper, nickel, tin and zinc.

9. A method according to claim 1, wherein the sintering at step b) is by a sintering powder that is:
   a) less than 15% by weight of the sprayed powder;
   b) less than 10% by weight of the sprayed powder; or
   c) less than 5% by weight of the sprayed powder.

10. A method according to claim 1, wherein the combination of the matrix forming powder and the sintering powder has a minority of elements that provide sintering at step b), the minority of elements comprising one or more of magnesium, silicon, carbon, nickel, copper, zinc, tin, aluminium, lithium, chrome, iron and manganese.

11. A method according to claim 1, wherein:
   a) the cold sprayed one or more metallic powder, as the sprayed powder comprises aluminium, Al—Si—Mg and copper and, at claim 1 step b), the item is:
      i. held at 524-610° C. for at least 1 to 7 hours; and subsequently
      ii. held at to 470-550° C.; and then
      iii. cooled such that alloying elements are in a saturated solid solution; or
   b) the sprayed powder comprises copper, and aluminium, up to about 15% by weight aluminium, and, at claim 1 step b), the item is held at 850-1000° C. for at least 8 to 16 hours; or
   c) the sprayed powder comprises copper and aluminium, up to about 15% by weight aluminium, with up to 4% iron, and up to 3% nickel or silicon; or
   d) the sprayed powder comprises copper and zinc, up to about 15% by weight zinc, and, at claim 1 step b), the item is held at 850-950° C. for at least 8-14 hours; or
   e) the sprayed powder comprises copper and tin, up to about 10% by weight tin, and, at claim 1 step b), the item is held at 850-950° C. for at least 8 to 14 hours; or
   f) the sprayed powder comprises iron and copper, up to about 5% by weight copper, and, at claim 1 step b), the item is held at 1,096-1,200° C. for at least 8-14 hours; or
   g) the sprayed powder comprises iron and nickel, up to about 5% by weight nickel, and, at claim 1 step b), the item is held at 1,455-1,490° C. for at least 8-14 hours; or
   h) the sprayed powder comprises nickel and copper, up to about 15% by weight copper, and, at claim 1 step b), the item is held at 1,100-1,300° C. for at least 8-14 hours.

12. A method according to claim 1, wherein:
   a) the cold sprayed one or more metallic powder, as the sprayed powder comprises aluminium, Al—Si—Mg and copper and, at claim 1 step b), the item is:
      i. held at 450-525° C. for 15-300 minutes; and subsequently
      ii. held at 524-610° C., for least 1-7 hours; and subsequently
      iii. held at to 470-550° C.; and then
      iv. cooled such that alloying elements are in a saturated solid solution; or
   b) the sprayed powder comprises copper and aluminium, up to about 15% by weight aluminium, and, at claim 1 step b), the item is:
      i. held at 325-400° C. for at least 4-18 hours; and subsequently
      ii. held at 850-1000° C. for at least 8-16 hours; or
   c) the sprayed powder comprises copper and zinc, up to about 15% by weight zinc, and, at claim 1 step b), the item is:
      i. held at 320- 400° C. for at least 1 to 8 hours; and subsequently
      ii. held at 850-950° C. for at least 8 to 14 hours; or
   d) the sprayed powder comprises copper and tin, up to about 10% by weight tin, and, at claim 1 step b), the item is:
      i. held at 200-230° C. for at least 1-8 hours; and subsequently
      ii. held at 850-950° C. for at least 8 to 14 hours; or
   e) the sprayed powder comprises copper and tin, up to about 10% by weight tin, and, at claim 1 step b), the item is:
      i. held at 231-400° C. for at least 5-25 minutes; and subsequently
      ii. held at to 850-950° C. for at least 8-14 hours; or
   f) the sprayed powder comprises iron and copper, up to about 5% by weight copper, and, at claim 1 step b), the item is:
      i. held at 800-1,096° C. for at least 1-8 hours; and subsequently ii. held at 1,096-1,200° C. for at least 8-14 hours; or
g) the sprayed powder comprises iron and nickel, up to about 5% by weight nickel, and, at claim 1 step b), the item is held at 1,455-1,490° C. for at least 8-14 hours; or
h) the sprayed powder comprises iron and nickel, up to about 5% by weight nickel, and, at claim 1 step b), the item is:
  i. held at 1,000-1,455° C. for at least 1-8 hours; and subsequently
  ii. held at 1,455-1,490° C. for at least 8-14 hours; or
i) the sprayed powder comprises iron and nickel, up to about 5% by weight nickel, and, at claim 1 step b), the item is:
  i. held at 1,455-1,490° C. for at least 8-14 hours; and subsequently
  ii. held at to 750-900° C., and subsequently
  iii. cooled to produce a martensitic structure; or
j) the sprayed powder comprises nickel and copper, up to about 15% by weight copper, and, at claim 1 step b), the item is:
  i. held at 900-1,100° C. for at least 1-8 hours; and subsequently
  ii. held at 1,100-1,300° C. for at least 8-14 hours.

13. A method according to claim 1, wherein:
a) the cold sprayed one or more metallic powder, as the sprayed powder comprises copper and aluminium, up to about 15% by weight aluminium, and, at claim 1 step b), the item is:
  i. held at 325-400° C. for at least 4-18 hours; and subsequently
  ii. held at 850-1,000° C. for at least 8-16 hours; and subsequently
  iii. held at to 800-1000° C.; and then
  iv. cooled such that alloying elements are in a saturated solid solution; or
b) the sprayed powder comprises copper and zinc, up to about 15% by weight zinc, and, at claim 1 step b), the item is:
  i. held at 320-400° C. for at least 1 to 8 hours; and subsequently
  ii. held at 420-550° C. for at least 5-25 minutes; and subsequently
  iii. held at 850-950° C. for at least 8 to 14 hours; or
c) the sprayed powder comprises iron and copper, up to about 5% by weight copper, and, at claim 1 step b), the item is:
  i. held at 1,096-1,200° C., for at least 8-14 hours; and subsequently
  ii. held at to 750-900° C., and subsequently
  iii. cooled to produce a martensitic structure.

14. A method according to claim 1, wherein:
a) the cold sprayed one or more metallic powder, as the sprayed powder consists of Aluminium, Al—Si—Mg and copper, and, at claim 1 step b), the item is:
  i. held at 524-610° C. for at least 1 to 7 hours; and subsequently
  ii. held at to 470-550° C.; and then
  iii. cooled such that alloying elements are in a saturated solid solution; or
b) the sprayed powder consists of Aluminium, Al—Si—Mg and copper and, at claim 1 step b), the item is:
  i. held at 450-525° C. for 15-300 minutes; and subsequently
  ii. held at 524-610° C., for least 1-7 hours; and subsequently
  iii. held at to 470-550° C.; and then
  iv. cooled such that alloying elements are in a saturated solid solution; or
c) the sprayed powder consists of copper, and aluminium, up to about 15% by weight aluminium, and, at claim 1 step b), the item is held at 850-1000° C. for at least 8 to 16 hours; or
d) the sprayed powder consists of copper and aluminium, up to about 15% by weight aluminium, and, at claim 1 step b), the item is:
  i. held at 325-400° C. for at least 4-18 hours; and subsequently
  ii. held at 850-1000° C. for at least 8-16 hours; or
e) the sprayed powder consists of copper and aluminium, up to about 15% by weight aluminium, and, at claim 1 step b), the item is:
  i. held at 325-400° C. for at least 4-18 hours; and subsequently
  ii. held at 850-1,000° C. for at least 8-16 hours; and subsequently
  iii. held at to 800-1000° C.; and then
  iv. cooled such that alloying elements are in a saturated solid solution; or
f) the sprayed powder consists of copper and aluminium, up to about 15% by weight aluminium, with up to 4% iron, and up to 3% nickel or silicon; or
g) the sprayed powder consists of copper and zinc, up to about 15% by weight zinc, and, at claim 1 step b), the item is held at 850-950° C. for at least 8-14 hours; or
h) the sprayed powder consists of copper and zinc, up to about 15% by weight zinc, and, at claim 1 step b), the item is:
  i. held at 320-400° C. for at least 1 to 8 hours; and subsequently
  ii. held at 850-950° C. for at least 8 to 14 hours; or
i) the sprayed powder consists of copper and zinc, up to about 15% by weight zinc, and, at claim 1 step b), the item is:
  i. held at 320-400° C. for at least 1 to 8 hours; and subsequently
  ii. held at 420-550° C. for at least 5-25 minutes; and subsequently
  iii. held at 850-950° C. for at least 8 to 14 hours; or
j) the sprayed powder consists of copper and tin, up to about 10% by weight tin, and, at claim 1 step b), the item is held at 850-950° C. for at least 8 to 14 hours; or
k) the sprayed powder consists of copper and tin, up to about 10% by weight tin, and, at claim 1 step b), the item is:
  i. held at 200-230° C. for at least 1-8 hours; and subsequently
  ii. held at 850-950° C. for at least 8 to 14 hours; or
l) the sprayed powder consists of copper and tin, up to about 10% by weight tin, and, at claim 1 step b), the item is:
  i. held at 231-400° C. for at least 5-25 minutes; and subsequently
  ii. held at to 850-950° C. for at least 8-14 hours; or
m) the sprayed powder consists of iron and copper, up to about 5% by weight copper, and, at claim 1 step b), the item is held at 1,096-1,200° C. for at least 8-14 hours; or
n) the sprayed powder consists of iron and copper, up to about 5% by weight copper, and, at claim 1 step b), the item is:
  i. held at 800-1,096° C. for at least 1-8 hours; and subsequently ii. held at 1,096-1,200° C. for at least 8-14 hours; or
o) the sprayed powder consists of iron and copper, up to about 5% by weight copper, and, at claim 1 step b), the item is:
  i. held at 1,096-1,200° C., for at least 8-14 hours; and subsequently
  ii. held at to 750-900° C., and subsequently
  iii cooled to produce a martensitic structure; or
p) the sprayed powder consists of iron and nickel, up to about 5% by weight nickel, and, at claim 1 step b), the item is held at 1,455-1,490° C. for at least 8-14 hours; or
q) the sprayed powder consists of iron and nickel, up to about 5% by weight nickel, and, at claim 1 step b), the item is:
  i held at 1,000-1,455° C. for at least 1-8 hours; and subsequently
  ii. held at 1,455-1,490° C. for at least 8-14 hours; or
r) the sprayed powder consists of iron and nickel, up to about 5% by weight nickel, and, at claim 1 step b), the item is:
  i. held at 1,455-1,490° C. for at least 8-14 hours; and subsequently
  ii. held at to 750-900° C., and subsequently
  iii. cooled to produce a martensitic structure; or
s) the sprayed powder consists of nickel and copper, up to about 15% by weight copper, and, at claim 1 step b), the item is held at 1,100-1,300° C. for at least 8-14 hours; or
t) the sprayed powder consists of nickel and copper, up to about 15% by weight copper, and, at claim 1 step b), the item is:
  i. held at 900-1,100° C. for at least 1-8 hours; and subsequently
  ii. held at 1,100-1,300° C. for at least 8-14 hours.

15. A method according to claim 1, wherein the cold sprayed one or more metallic powder, as the sprayed powder at claim 1 step a) consists of or comprises:
a) spheroidal particles; and/or
b) particles that are not irregular, spiky or rough; and/or
c) particles, at least 90% of which are 15-80 μm in span;
d) particles, at least 90% of which are 15-45 μm span.

16. A method according to claim 1, wherein the matrix forming powder has a hardness of less than 200 HV.

17. A method according to claim 1, wherein the matrix forming powder has a hardness of less than 150 HV.

18. A method according to claim 1, wherein the matrix forming powder has a hardness of less than 100 HV.

19. A method according to claim 1, wherein:
a) a shape of the item when formed is substantially determined by the matrix forming powder;
b) it is substantially only the sintering powder that liquefies at step b);
c) matrix forming powder has an additional metallic content of:
  i. less than 3% by weight,
  ii. less than 2.2% by weight, or
  iii. less than 1.5%, by weight;
d) at least most of the matrix forming powder comprises primarily one or more of aluminium, copper, nickel, iron and/or a 6000 series aluminium alloy;
e) the sintering at step b) is by a sintering powder comprising a majority of one or more of aluminium, copper, nickel, tin and zinc; and
f) the combination of the matrix forming powder and the sintering powder has a minority of elements that provide sintering at step b), the minority comprising one or more of magnesium, silicon, carbon, nickel, copper, zinc, tin, aluminium, lithium, chrome, iron and manganese.

20. A method according to claim 1, wherein:
a) a shape of the item when formed is substantially determined by the matrix forming powder;
b) it is substantially only the sintering powder that liquefies at step b);
c) at least most of the matrix forming powder comprises primarily one or more of aluminium, copper, nickel, iron and/or a 6000 series aluminium alloy;
d) the sintering at step b) is by a sintering powder comprising a majority of one or more of aluminium, copper, nickel, tin and zinc; and
e) the combination of the matrix forming powder and the sintering powder has a minority of elements that provide sintering at step b), the minority comprising one or more of magnesium, silicon, carbon, nickel, copper, zinc, tin, aluminium, lithium, chrome, iron and manganese.

* * * * *